United States Patent
Brockhaus et al.

(10) Patent No.: US 12,123,754 B2
(45) Date of Patent: Oct. 22, 2024

(54) MAGNETIC-INDUCTIVE FLOWMETER AND METHOD OF OPERATING THE SAME

(71) Applicant: KROHNE Messtechnik GmbH, Duisburg (DE)

(72) Inventors: Helmut Brockhaus, Oberhausen (DE); Markus Dabrowski, Duisburg (DE); Ulrike Schwenger, Essen (DE)

(*) Notice: Subject to any disclaimer, the term of this patent is extended or adjusted under 35 U.S.C. 154(b) by 277 days.

(21) Appl. No.: 17/933,688

(22) Filed: Sep. 20, 2022

(65) Prior Publication Data

US 2023/0123114 A1 Apr. 20, 2023

(30) Foreign Application Priority Data

Oct. 20, 2021 (DE) .......................... 102021127230.0

(51) Int. Cl.
*G01F 1/58* (2006.01)
*G01F 1/60* (2006.01)
*G01N 27/02* (2006.01)

(52) U.S. Cl.
CPC ............. *G01F 1/584* (2013.01); *G01N 27/02* (2013.01); *G01F 1/586* (2013.01); *G01F 1/588* (2013.01); *G01F 1/60* (2013.01)

(58) Field of Classification Search
CPC . G01F 1/584; G01F 1/60; G01F 1/586; G01F 1/588; G01N 27/02
See application file for complete search history.

(56) References Cited

U.S. PATENT DOCUMENTS

| | | | |
|---|---|---|---|
| 6,392,416 B1 | 5/2002 | Keech | |
| 10,712,185 B2 | 7/2020 | Brockhaus et al. | |
| 2015/0000421 A1 | 1/2015 | Brockhaus et al. | |
| 2019/0277679 A1* | 9/2019 | Tschambser | G01F 1/588 |
| 2020/0309578 A1* | 10/2020 | Drachmann | G01F 1/60 |
| 2020/0309579 A1 | 10/2020 | Brockhaus et al. | |

FOREIGN PATENT DOCUMENTS

| | | |
|---|---|---|
| DE | 3303017 C1 | 7/1984 |
| DE | 102014007426 A1 | 1/2015 |
| JP | 04128614 A | 4/1992 |
| JP | 2014109529 A | 6/2014 |

* cited by examiner

*Primary Examiner* — Peter J Macchiarolo
*Assistant Examiner* — John M Royston
(74) *Attorney, Agent, or Firm* — Patrick D. Duplessis

(57) ABSTRACT

A magnetic-inductive flowmeter includes a tube, electrodes in contact with a medium in the tube, a magnetic field generator, an impedance signal generator, and a control device. A first signal path interconnects the impedance signal generator and a first electrode, and a second signal path interconnects the impedance signal generator and a second electrode. A first switch and first and third capacitors are connected such that, in a first state, only the first capacitor and, in a second state, only the third capacitor is in the first signal path. A second switch and second and fourth capacitors are connected such that, in a first state, only the second capacitor and, in a second state, only the fourth capacitor is in the second signal path. The control device sets the switches to the first state during a positive magnetic phase and to the second state during a negative magnetic phase.

11 Claims, 2 Drawing Sheets

MAGNETIC-INDUCTIVE FLOWMETER AND METHOD OF OPERATING THE SAME

TECHNICAL FIELD

On the one hand, the invention includes a magnetic-inductive flowmeter having a measuring tube, a first electrode, a second electrode, a magnetic field generator, an impedance signal generator, a coupling device, and a control device.

The first electrode and the second electrode are arranged on the measuring tube for direct contact with a medium in the measuring tube. During operation of the magnetic-inductive flowmeter, a medium is in the measuring tube and then the first electrode and the second electrode are also in direct contact with the medium.

The magnetic field generator is designed to generate an alternating magnetic field with a positive magnetic field phase and a negative magnetic field phase in the medium in the measuring tube. The impedance signal generator is designed to generate excitation signals.

The coupling device has a first capacitor, a second capacitor, a first signal path, and a second signal path. The first signal path connects the impedance signal generator and the first electrode, and the second signal path connects the impedance signal generator and the second electrode for transmitting the excitation signals to each other.

The control device is designed for determining a flow rate of a medium through the measuring tube using flow rate measurement signals caused in the medium by the alternating magnetic field and measurable at the first electrode and the second electrode. Further, the control device is designed for determining an impedance of the medium in the measuring tube using impedance measurement signals caused by the excitation signals and measurable at the first electrode and the second electrode.

On the other hand, the invention also relates to a method of operating a magnetic-inductive flowmeter. The magnetic-inductive flowmeter has a measuring tube, a first electrode, a second electrode, a magnetic field generator, an impedance signal generator, a coupling device, and a control device.

The first electrode and the second electrode are arranged on the measuring tube for direct contact with a medium in the measuring tube.

The coupling means has a first capacitor, a second capacitor, a first signal path, and a second signal path.

The first signal path connects the impedance signal generator and the first electrode, and the second signal path connects the impedance signal generator and the second electrode.

An alternating magnetic field having a positive magnetic field phase and a negative magnetic field phase is generated by the magnetic field generator in the medium in the measuring tube.

A flow rate of the medium through the measuring tube is determined by the control device using flow rate measurement signals induced by the alternating magnetic field medium and measured at the first electrode and the second electrode.

Excitation signals are generated by the impedance signal generator. Starting from the impedance signal generator, the excitation signals are transmitted via the first signal path to the first electrode and via the second signal path to the second electrode.

An impedance of the medium in the measuring tube is determined by the control device using impedance measurement signals caused by the excitation signals and measured at the first electrode and the second electrode.

When the first and second electrodes are in direct contact with a medium, they are in galvanic contact with the medium.

During operation of the magnetic-inductive flowmeter, the impedance signal generator produces the excitation signals. The excitation signals are fed from the first signal path to the first electrode as well as from the second signal path to the second electrode. The first signal path contains the first capacitor and the second signal path contains the second capacitor. The first and second capacitors galvanically separate the impedance signal generator from the first and second electrodes, on the one hand, and ensure transmission of the excitation signals generated by the impedance signal generator to the first and second electrodes, on the other hand. In this sense, the first and second capacitors are coupling capacitors.

During operation of the magnetic-inductive flowmeter, the magnetic field generator generates the alternating magnetic field and the control device determines the flow of the medium through the measuring tube using the flow measurement signals induced in the medium by the alternating magnetic field and measured at the first and second electrodes. Thus, the flow measurement signals include those measured at the positive magnetic field phase and those measured at the negative magnetic field phase. This has the advantage that an effect of interference and parasitic effects is at least reduced and the determination of the flow rate is more accurate.

BACKGROUND

It has been recognized that in the coupling device a retroactive effect occurs from the determination of the impedance of the medium on the determination of the flow rate of the medium, which affects an accuracy of the determination of the flow rate. The coupling results from the first and second capacitors being recharged by the flow measurement signals induced in the medium by the alternating magnetic field and applied to the first and second electrodes. The retroactive effect remains even if the first and second signal paths are each separated by a switch, due to parasitic double-layer capacitances between the first and second electrodes and the medium. One way to reduce the retroactive effect is to reduce an amplitude of the excitation signals. However, this also decreases an accuracy of determining the impedance of the medium.

SUMMARY

Therefore, the object of the present invention is to provide a magnetic-inductive flowmeter and a method of operating a magnetic-inductive flowmeter in which the retroactive effect is reduced. Preferably, an accuracy of determining the impedance and an accuracy of determining the flow rate of the medium are not affected.

The object is achieved by a magnetic-inductive flowmeter having the disclosed features.

The magnetic-inductive flowmeter is characterized in that the coupling device comprises a third capacitor, a fourth capacitor, a first switch and a second switch.

The first switch, the first capacitor and the third capacitor are connected to each other in such a way and the first switch is designed in such a way that, in a first switching state of the first switch, only the first capacitor and, in a second switching state of the first switch, only the third capacitor is connected into the first signal path. Accordingly, during operation of the magnetic-inductive flowmeter, the first switch causes either only the first capacitor or only the third capacitor to be connected into the first signal path. Further, the second switch, the second capacitor and the fourth capacitor are connected to each other in such a way and the second switch is designed in such a way that, in a first switching state of the second switch, only the second capacitor is connected into the second signal path and, in a second switching state of the second switch, only the fourth capacitor is connected into the second signal path. Accordingly, during operation of the magnetic-inductive flowmeter, the second switch causes either only the second capacitor or only the fourth capacitor to be connected into the second signal path. Preferably, the first and second switches each have only the two switching states.

Further, the control device is designed to set the first switch and the second switch to the first switching state for a duration of the positive magnetic field phase and to the second switching state for a duration of the negative magnetic field phase.

This prevents the first, second, third and fourth capacitors from being recharged by flow measurement signals induced in the medium by the alternating magnetic field and applied to the first and second electrodes. In any case, this reduces the retroactive effect.

The impedance signal generator is preferably designed to generate the excitation signals in determined ways, in particular as current signals. The excitation signals preferably have a rectangular waveform over time. The excitation signals are preferably impressed into the medium on the one hand via the first signal path and the first electrode and on the other hand via the second signal path and the second electrode when the alternating magnetic field has not yet settled. This is because if the alternating magnetic field has not yet settled, then the flow rate of the medium cannot yet be determined with sufficient accuracy, which is why the flow rate is not determined until the alternating magnetic field has settled. This means that the determination of the flow rate of the medium and the determination of the impedance of the medium are separated in time. Mutual interference is prevented by the temporal separation. The determination of the impedance also includes the determination of the conductivity of the medium.

The first and second switches can be implemented in various ways.

In one design of the electromagnetic flowmeter, the first and second switches are each two single pole single throw switches. Single pole single throw is abbreviated as SPST. In another design, the first and second switches are each a single pole changeover switch. A single pole changeover switch is also referred to as a single pole double throw and is abbreviated SPDT. The implementation of the first and second switches using single pole single throw switches and single pole changeover switches is particularly simple.

It has been recognized that series deviation between switches results in a different amount of injection of charge carriers when the switches are switched, causing a retroactive effect from the determination of the impedance of the medium to the determination of the flow rate of the medium, which affects an accuracy of the determination of the flow rate. Therefore, in a further design, the first and second switches are implemented using a multiplexer. By using a multiplexer, a difference between the charge induced by the first switch, and the charge induced by the second switch, is reduced, which also reduces the retroactive effect.

In a further design, the first switch and the second switch are semiconductor switches. In particular, the first and second switches are implemented on the same die. In a particularly preferred design, the multiplexer is implemented with semiconductor switches.

In a further design, the first and second switches are arranged in the same housing. By being arranged in the same housing, it is achieved that the first and second switch are exposed to the same environmental conditions and in particular have the same temperature.

In a further design of the magnetic-inductive flowmeter, the first switch is located between, on the one hand, the first and third capacitors and, on the other hand, the impedance signal generator, and the second switch is located between, on the one hand, the second and fourth capacitors and, on the other hand, the impedance signal generator.

In a further design, the control device is designed to measure the flow measurement signals and/or the impedance measurement signals as voltages between the first and second electrodes.

In a further design, the alternating magnetic field is a pulsating DC magnetic field. The pulsating DC magnetic field has, alternating over time, a first magnetic field direction and a second magnetic field direction antiparallel to the first. Thereby, an amount of a magnetic field strength in a steady state is constant for both magnetic field directions.

The object is also achieved by a method for operating a magnetic-inductive flowmeter having the disclosed features.

The coupling device of the magnetic-inductive flowmeter carrying out this method additionally comprises a third capacitor, a fourth capacitor, a first switch and a second switch.

The method previously described is modified as follows: the first switch and the second switch are set to a first state by the control device for a duration of the positive magnetic field phase, so that only the first capacitor is switched into the first signal path and only the second capacitor is switched into the second signal path.

Further, the control device places the first switch and the second switch in a second state for a duration of the negative magnetic field phase so that only the third capacitor is switched into the first signal path and only the fourth capacitor is switched into the second signal path.

In one design, the magnetic-inductive flowmeter carrying out the method is formed according to at least one of the previously described designs.

In all other respects, the explanations regarding the magnetic-inductive flowmeter apply mutatis mutandis to the method for operating an electromagnetic flowmeter and vice versa.

BRIEF DESCRIPTION OF THE DRAWINGS

In detail, a multitude of possibilities are given for designing and further developing the magnetic-inductive flowmeter and the method. For this, reference is made to the following description of a preferred embodiment in connection with the drawings.

DETAILED DESCRIPTION

Figure 1:
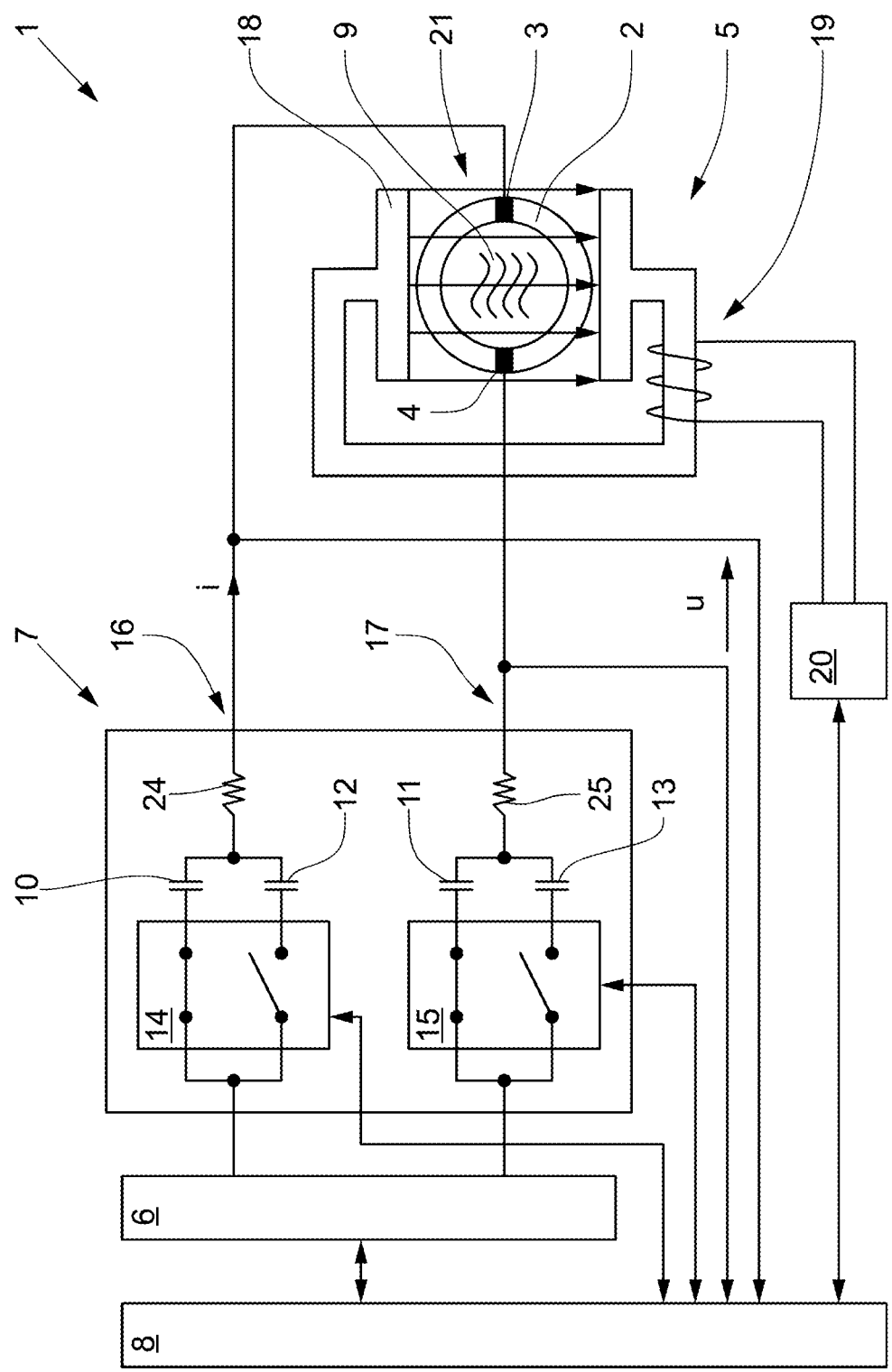
FIG. 1 illustrates an embodiment of a magnetic-inductive flowmeter.

FIG. 1 shows essential elements of an embodiment of a magnetic-inductive flowmeter 1 abstracted and during operation. The magnetic-inductive flowmeter 1 has a measuring tube 2, a first electrode 3, a second electrode 4, a magnetic field generator 5, an impedance signal generator 6, a coupling device 7 and a control device 8.

Since the magnetic-inductive flowmeter 1 is in operation, a medium 9 is made to flow through the measuring tube 2. The first electrode 3 and the second electrode 4 are arranged on the measuring tube for direct contact with the medium 9 on the measuring tube 2. Presently, the first electrode 3 and the second electrode 4 are in direct contact with the medium 9.

The coupling device 7 has a first capacitor 10, a second capacitor 11, a third capacitor 12, a fourth capacitor 13, a first switch 14, a second switch 15, a first signal path 16 and a second signal path 17.

The first signal path 16 connects the impedance signal generator 6 and the first electrode 3 together, and the second signal path 17 connects the impedance signal generator 6 and the second electrode 4 together.

Figure 2:
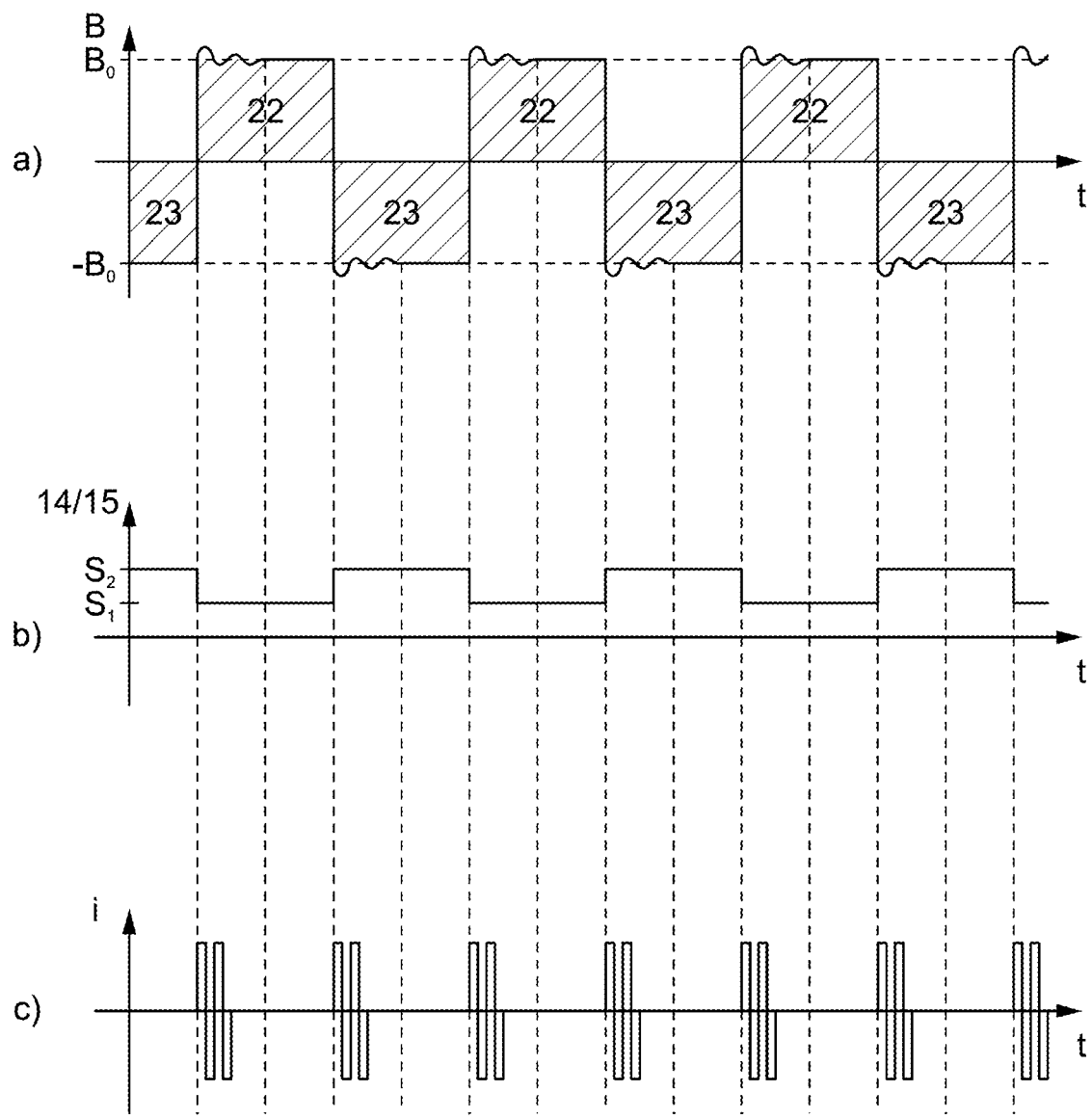
FIG. 2 illustrates a temporal course of signals during operation of the magnetic-inductive flowmeter.

The magnetic field generator 5 has a yoke 18, a coil 19 and a source 20. The source 20 is controllable by the control device 8 and feeds the coil 19. The magnetic field generator 5 is designed to generate an alternating magnetic field 21 with a positive magnetic field phase 22 and a negative magnetic field phase 23 in the medium 9 in the measuring tube 2. In the present embodiment, the alternating magnetic field is a pulsating DC magnetic field. The pulsating DC magnetic field has, alternating over time, a first magnetic field direction and a second magnetic field direction antiparallel to the first. An absolute value $B_0$ of a magnetic flux density B in a steady state is constant for both magnetic field directions. Refer to FIG. 2*a*.

The control device 8 is designed for determining a flow rate of the medium 9 through the measuring tube 2 using flow rate measurement signals induced in the medium by the alternating magnetic field 21 and measurable at the first electrode 3 and the second electrode 4. In this embodiment, the control device 8 is designed for measuring the flow measurement signals as voltages u between the first electrode 3 and the second electrode 4.

The impedance signal generator 6 is designed for generating excitation signals. In this embodiment, the excitation signals are current signals i, see FIG. 2*c*, which are impressed into the medium 9 on the one hand via the first signal path 16 and the first electrode 3 and on the other hand via the second signal path 17 and the second electrode 4.

Further, the control device 8 is designed for determining an impedance of the medium 9 in the measuring tube 2 using impedance measurement signals caused by the excitation signals i and measurable at the first electrode 3 and the second electrode 4. In this embodiment, the control device 8 is designed for measuring the impedance measurement signals as voltages u between the first electrode 3 and the second electrode 4.

The first switch 14 and the second switch 15 are each implemented by a multiplexer in the present embodiment. The multiplexers are semiconductor switches implemented on the same die. Also, the first switch 14 and the second switch 15 are arranged in the same housing.

The first switch 14 is arranged between, on the one hand, the first capacitor 10 and the third capacitor 12 and, on the other hand, the impedance signal generator 6. The second switch 15 is arranged between, on the one hand, the second capacitor 11 and the fourth capacitor 13 and, on the other hand, the impedance signal generator 6. Further, in the first signal path 16, a resistor 24 is arranged between, on the one hand, the first capacitor 10 and the second capacitor 12 and, on the other hand, the first electrode 3. Correspondingly, a second resistor 25 is arranged in the second signal path 17 between, on the one hand, the second capacitor 11 and the fourth capacitor 13 and, on the other hand, the second electrode 4. The first resistor 24 and the second resistor 25 serve to limit the current i.

The first switch 14, the first capacitor 10 and the third capacitor 12 are connected to each other in such a way and the first switch 14 is designed in such a way that in a first switching state $S_1$ only the first capacitor 10 and in a second switching state $S_2$ only the third capacitor 12 is connected in the first signal path 16. The second switch 15, the second capacitor 11 and the fourth capacitor 13 are connected to each other in such a way and the second switch 15 is designed in such a way that in a first switching state $S_1$ only the second capacitor 11 and in a second state $S_2$ only the fourth capacitor 13 is switched into the second signal path 17. In FIG. 1, the first switch 14 and the second switch 15 are each shown in the first switching state $S_1$.

The control device 8 is designed to set the first switch 14 and the second switch 15 to the first switching state $S_1$ for a duration of the positive magnetic field phase 22 and to the second switching state $S_2$ for the duration of the negative magnetic field phase 23.

During operation, the magnetic-inductive flowmeter 1 carries out the following method:

The alternating magnetic field 21 with the positive magnetic field phase 22 and the negative magnetic field phase 23 is generated in the medium 9 in the measuring tube 2 by the magnetic field generator 5.

A flow rate of the medium 9 through the measuring tube 2 is determined by the control device 8 using voltages u induced by the alternating magnetic field 21 in the medium 9 and measured at the first electrode 3 and the second electrode 4 as flow rate measuring signals.

The excitation signals are generated by the impedance signal generator 6. The excitation signals are then impressed into the medium 9 when the alternating magnetic field 21 has not yet settled. As a result, the determinations of the flow rate of the medium 9 and the determination of the conductivity of the medium 9 are separated in time.

The first switch 14 and the second switch 15 are set to the first state $S_1$ for the duration of the positive magnetic field phase 22 by the control device 8, so that only the first capacitor 10 is switched into the first signal path 16 and only the second capacitor 11 is switched into the second signal path 17.

Further, the control device 8 sets the first switch 14 and the second switch 15 to the second state $S_2$ for the duration of the negative magnetic field phase 23, so that only the third capacitor 12 is switched into the first signal path 16 and only the fourth capacitor 13 is switched into the second signal path 17.

Further, a conductivity of the medium 9 in the measuring tube is determined by the control device using voltages u caused by the excitation signals i and measured at the first electrode 3 and at the second electrode 4 as impedance measurement signals.

The invention claimed is:

1. A magnetic-inductive flowmeter, comprising:
   a measuring tube;
   a first electrode;
   a second electrode
   a magnetic field generator;
   an impedance signal generator;
   a coupling device; and
   a control device;

wherein the first electrode and the second electrode are arranged on the measuring tube for direct contact with a medium in the measuring tube;

wherein the magnetic field generator is designed to generate an alternating magnetic field with a positive magnetic field phase and a negative magnetic field phase in the medium in the measuring tube;

wherein the impedance signal generator is designed to generate excitation signals;

wherein the coupling device comprises a first capacitor, a second capacitor, a first signal path and a second signal path;

wherein the first signal path interconnects the impedance signal generator and the first electrode and the second signal path interconnects the impedance signal generator and the second electrode for transmitting the excitation signals;

wherein the control device is designed for determining a flow rate of a medium through the measuring tube using flow rate measurement signals caused by the alternating magnetic field in the medium and measurable at the first electrode and the second electrode;

wherein the control device is designed to determine an impedance of the medium in the measuring tube using impedance measurement signals induced by the excitation signals and measurable at the first electrode and the second electrode;

wherein the coupling device has a third capacitor, a fourth capacitor, a first switch and a second switch;

wherein the first switch, the first capacitor and the third capacitor are connected to one another in such a way and the first switch is designed in such a way that, in a first switching state, only the first capacitor and, in a second switching state, only the third capacitor are connected in the first signal path;

wherein the second switch, the second capacitor and the fourth capacitor are connected to one another in such a way and the second switch is designed in such a way that, in a first switching state, only the second capacitor and, in a second switching state, only the fourth capacitor is connected into the second signal path; and wherein the control device is designed to set the first switch and the second switch to the first switching state for a duration of the positive magnetic field phase and to set them to the second switching state for a duration of the negative magnetic field phase.

2. The magnetic-inductive flowmeter according to claim 1, wherein the first switch and the second switch are each two single pole single throw switches.

3. The magnetic-inductive flowmeter according to claim 1, wherein the first switch and the second switch are each a single-pole changeover switch.

4. The magnetic-inductive flowmeter according to claim 1, wherein the first switch and the second switch are implemented with a multiplexer.

5. The magnetic-inductive flowmeter according to claim 1, wherein the first switch and the second switch are semiconductor switches implemented on the same die.

6. The magnetic-inductive flowmeter according to claim 1, wherein the first switch and the second switch are arranged in the same housing.

7. The magnetic-inductive flowmeter according to claim 1, wherein the first switch is located between, on the one hand, the first capacitor and the third capacitor and, on the other hand, the impedance signal generator; and wherein the second switch is located between, on the one hand, the second capacitor and the fourth capacitor and, on the other hand, the impedance signal generator.

8. The magnetic-inductive flowmeter according to claim 1, wherein the control device is designed to measure the flowmeter signals and/or the impedance measurement signals as voltages between the first electrode and the second electrode.

9. The magnetic-inductive flowmeter according to claim 1, wherein the alternating magnetic field is a pulsating DC magnetic field.

10. A method for operating a magnetic-inductive flowmeter including a measuring tube, a first electrode, a second electrode, a magnetic field generator, an impedance signal generator, a coupling device and a control device, wherein the first electrode and the second electrode are arranged on the measuring tube for direct contact with a medium in the measuring tube, wherein the coupling device comprises a first capacitor, a second capacitor, a third capacitor, a fourth capacitor, a first switch, a second switch, a first signal path and a second signal path, wherein the first signal path interconnects the impedance signal generator and the first electrode and the second signal path interconnects the impedance signal generator and the second electrode, the method comprising:

generating, by the magnetic field generator, an alternating magnetic field with a positive magnetic field phase and a negative magnetic field phase in the medium in the measuring tube;

determining, by the control device, a flow rate of the medium through the measuring tube using flow rate measurement signals induced by the alternating magnetic field in the medium and measured at the first electrode and the second electrode;

generating, by the impedance signal generator, excitation signals;

transmitting the excitation signals from the impedance signal generator via the first signal path to the first electrode and via the second signal path to the second electrode;

setting, by the control device, the first switch and the second switch to a first state for a duration of the positive magnetic field phase, so that only the first capacitor is switched into the first signal path and only the second capacitor is switched into the second signal path;

setting, by the control device, the first switch and the second switch set to a second state for a duration of the negative magnetic field phase, so that only the third capacitor is connected in the first signal path and only the fourth capacitor is connected in the second signal path; and determining, by the control device, an impedance of the medium in the measuring tube using impedance measurement signals caused by the excitation signals and measured at the first electrode and the second electrode.

11. The method according to claim 10, wherein the magnetic-inductive flowmeter is configured such that at least one of:

the first switch and the second switch are each two single pole single throw switches;

the first switch and the second switch are each a single-pole changeover switch;

the first switch and the second switch are implemented with a multiplexer;

the first switch and the second switch are semiconductor switches implemented on the same die;

the first switch and the second switch are arranged in the same housing;

the first switch is located between, on the one hand, the first capacitator and the third capacitator and, on the other hand, the impedance signal generator, and the second switch is located between, on the one hand, the second capacitor and the fourth capacitor and, on the other hand, the impedance signal generator;

the control device is designed to measure the flowmeter signals and/or the impedance measurement signals as voltages between the first electrode and the second electrode; and the alternating magnetic field is a pulsating DO magnetic field.

* * * * *